United States Patent
Nakamura

(10) Patent No.: US 7,600,158 B2
(45) Date of Patent: Oct. 6, 2009

(54) ELECTRONIC APPARATUS FOR WHICH PROGRAM IS REWRITABLE AND PROGRAM REWRITING METHOD

(75) Inventor: Akihiro Nakamura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 10/922,998

(22) Filed: Aug. 23, 2004

(65) Prior Publication Data

US 2005/0050380 A1 Mar. 3, 2005

(30) Foreign Application Priority Data

Aug. 29, 2003 (JP) .............................. 2003-307181
Aug. 9, 2004 (JP) .............................. 2004-232500

(51) Int. Cl.
*G06F 11/00* (2006.01)
(52) U.S. Cl. ....................................................... 714/44
(58) Field of Classification Search ................... 714/44, 714/5; 358/1.14
See application file for complete search history.

(56) References Cited

U.S. PATENT DOCUMENTS

| 5,228,118 | A | * | 7/1993 | Sasaki ........................ 358/1.13 |
| 5,580,177 | A | * | 12/1996 | Gase et al. .................... 400/61 |
| 6,002,846 | A | * | 12/1999 | Okamoto ..................... 358/1.16 |
| 6,028,675 | A | * | 2/2000 | Fields et al. ................. 358/1.14 |
| 6,567,175 | B1 | * | 5/2003 | Lee ............................. 358/1.14 |
| 6,817,792 | B2 | * | 11/2004 | Parry ............................. 400/74 |
| 6,930,785 | B1 | * | 8/2005 | Weyand et al. ................ 358/1.1 |
| 6,950,863 | B1 | * | 9/2005 | Pham et al. ................... 709/221 |
| 7,028,308 | B2 | * | 4/2006 | Kim ............................. 719/321 |
| 7,031,012 | B1 | * | 4/2006 | Serizawa ..................... 358/1.16 |
| 7,398,331 | B2 | * | 7/2008 | Aoyama ......................... 710/8 |
| 2002/0067504 | A1 | * | 6/2002 | Salgado et al. .............. 358/1.15 |
| 2003/0159090 | A1 | * | 8/2003 | Wray et al. .................... 714/38 |
| 2003/0231333 | A1 | * | 12/2003 | Nakamura et al. .......... 358/1.14 |

FOREIGN PATENT DOCUMENTS

| JP | 9-97221 | 4/1997 |
| JP | 10-83358 | 3/1998 |
| JP | 2001-56787 A | 2/2001 |
| JP | 2003-216432 A | 7/2003 |

* cited by examiner

*Primary Examiner*—Robert Beausoliel
*Assistant Examiner*—Amine Riad
(74) *Attorney, Agent, or Firm*—Fitzpatrick, Cella, Harper & Scinto

(57) ABSTRACT

An electronic apparatus includes a memory for rewritably storing data and a processor for performing an operation of rewriting the data in the memory in response to a rewrite instruction signal. The processor checks each predetermined unit of data for rewriting received in response to the rewrite instruction signal to perform a rewriting operation for each predetermined unit and checks the amount of rewritten data to perform a data rewriting operation.

13 Claims, 10 Drawing Sheets

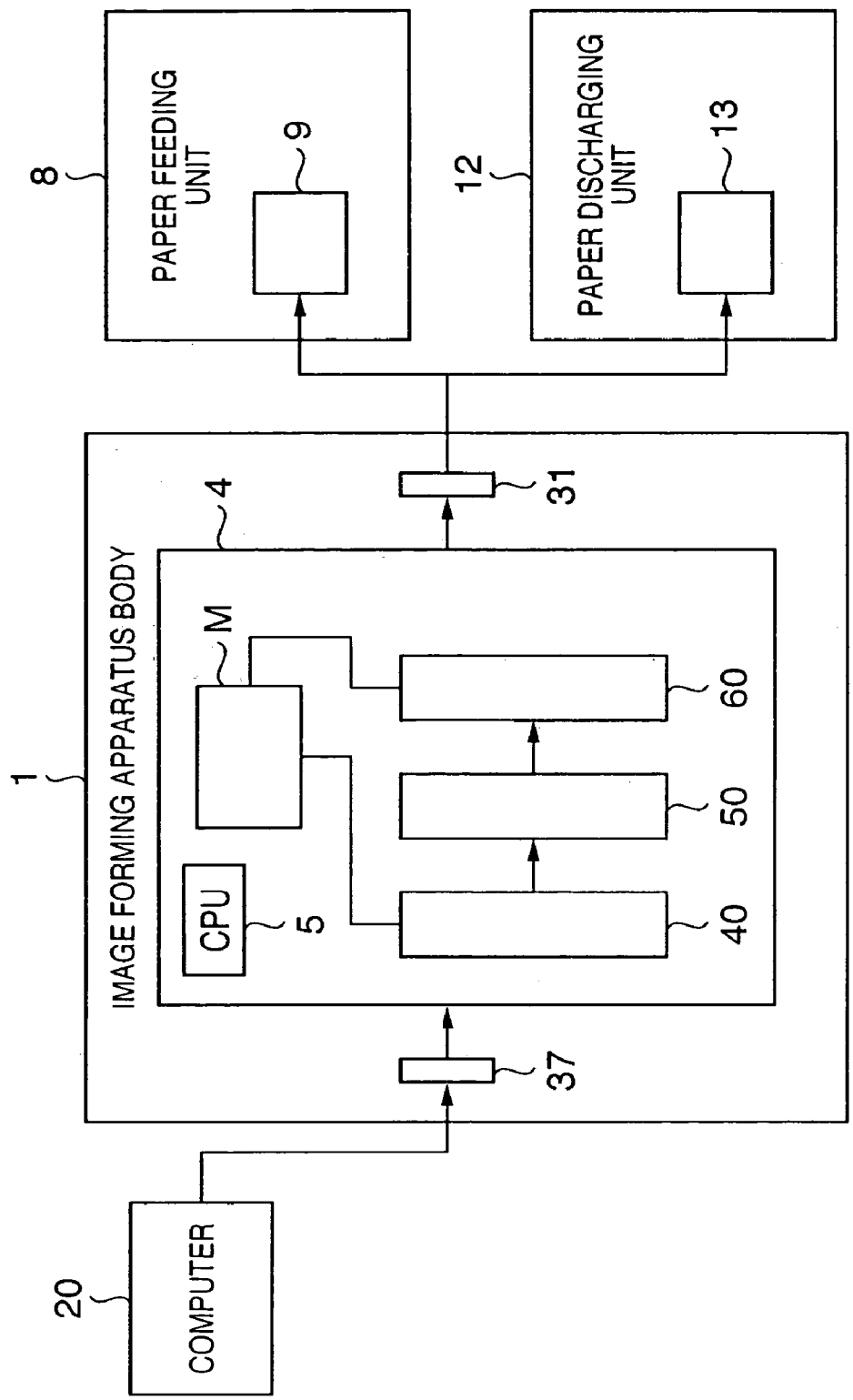

ELECTRONIC APPARATUS FOR WHICH PROGRAM IS REWRITABLE AND PROGRAM REWRITING METHOD

FIELD OF THE INVENTION

The present invention relates to version upgrade of a control program to be executed in an image forming apparatus or an optional apparatus of an image forming apparatus, for example, and in particular to an optional apparatus of an image forming apparatus, capable of detecting a communication error caused when version upgrade is performed, causing a version upgrade operation to be performed again when the communication error is caused and accomplishing version upgrade without fail, an image forming apparatus using the optional apparatus and a version upgrade method for program control equipment.

BACKGROUND OF THE INVENTION

For some image forming apparatuses such as copying machines, printers and digital complex machines, there are prepared optional apparatuses to be optionally attached, such as a finisher having functions of paper sorting, stapling and the like and an original paper feeder. Some of these optional apparatuses have a CPU-mounted control substrate and cause the CPU to execute a program recorded on a memory included in the CPU or a memory mounted on the control substrate in order to control cooperation with the body of the image forming apparatus, operations and the like. If an error is found in the control program for the optional apparatus, the program error must be modified. Furthermore, update of the control program may be required for function enhancement. As a program modification method to be used in such cases, the following two have been commonly employed:

(1) To exchange a recording medium such as ROM on which the program is recorded; and
(2) To use a rewritable, non-volatile medium as the medium for recording a control program for an optional apparatus and rewrite a program recorded on the medium.

As a method (2), there is also proposed a method of sending a program via communication to perform version upgrade of a program stored in a flash memory (Japanese Patent Laid-Open No. 9-97221).

When these two methods are compared, the method (2) which utilizes communication is more advantageous in that stop time of the apparatus is shorter and remote maintenance can be realized. Therefore, actually, the method (2) is used more frequently.

However, the method (2) of rewriting a control program included in an apparatus has the following problems:

Problem 1: In the case where a user rewrites the entire program, there is a possibility that the program rewriting will result in a failure due to operational mistakes made by the user or due to power-off during rewriting. The failure in program rewriting may cause inoperability of the optional apparatus.

Problem 2: In the case of performing version upgrade of a program via communication, if a communication error occurs and causes loss of a part of the program or data, it may result in a failure in rewriting of the program (version upgrade) and inoperability of the optional apparatus.

SUMMARY OF THE INVENTION

The present invention has been made in consideration of the prior-art examples described above An object of the present invention is to improve a prior-art apparatus for which the program is rewritable and a rewriting method.

Another object is to provide an apparatus for which, and a method with which version upgrade of a program or data can be performed more securely when such version upgrade is performed via communication.

In order to achieve the above objects, there are provided configurations as shown below:

an electronic apparatus comprising: a memory for rewritably storing data; and a processor for performing an operation of rewriting the data in the memory in response to a rewrite instruction signal; wherein the processor checks each predetermined unit of data for rewriting received in response to the rewrite instruction signal to perform a rewriting operation for each predetermined unit and furthermore checks the amount of rewritten data to perform a data rewriting operation;

an optional apparatus using the above electronic apparatus, the electronic apparatus further comprising a paper discharging apparatus connected to an image forming apparatus for performing image forming based on printing data; wherein the data rewritably stored in the memory is program data for controlling the paper discharging apparatus;

an optional apparatus using the above electronic apparatus, the electronic apparatus further comprising a paper feeding apparatus connected to an image forming apparatus for performing image forming based on printing data; wherein the data rewritably stored in the memory is program data for controlling the paper feeding apparatus; and a memory data rewriting method, comprising the processes of: storing data in predetermined units in a memory; checking data of the predetermined unit to be written to the memory; and checking the amount of the written data.

Further objects of the present invention will be apparent from the detailed description of the detailed description of the preferred embodiments with reference to the accompanying drawings.

BRIEF DESCRIPTION OF THE DRAWINGS

FIG. 4 is a flowchart showing processings performed by a CPU 5 of the image forming apparatus of the First Embodiment after the apparatus is powered on;

FIG. 10 is a block diagram of an image forming control substrate of the image forming apparatus of the First Embodiment.

DETAILED DESCRIPTION OF THE PREFERRED EMBODIMENTS

First Embodiment

Figure 1:
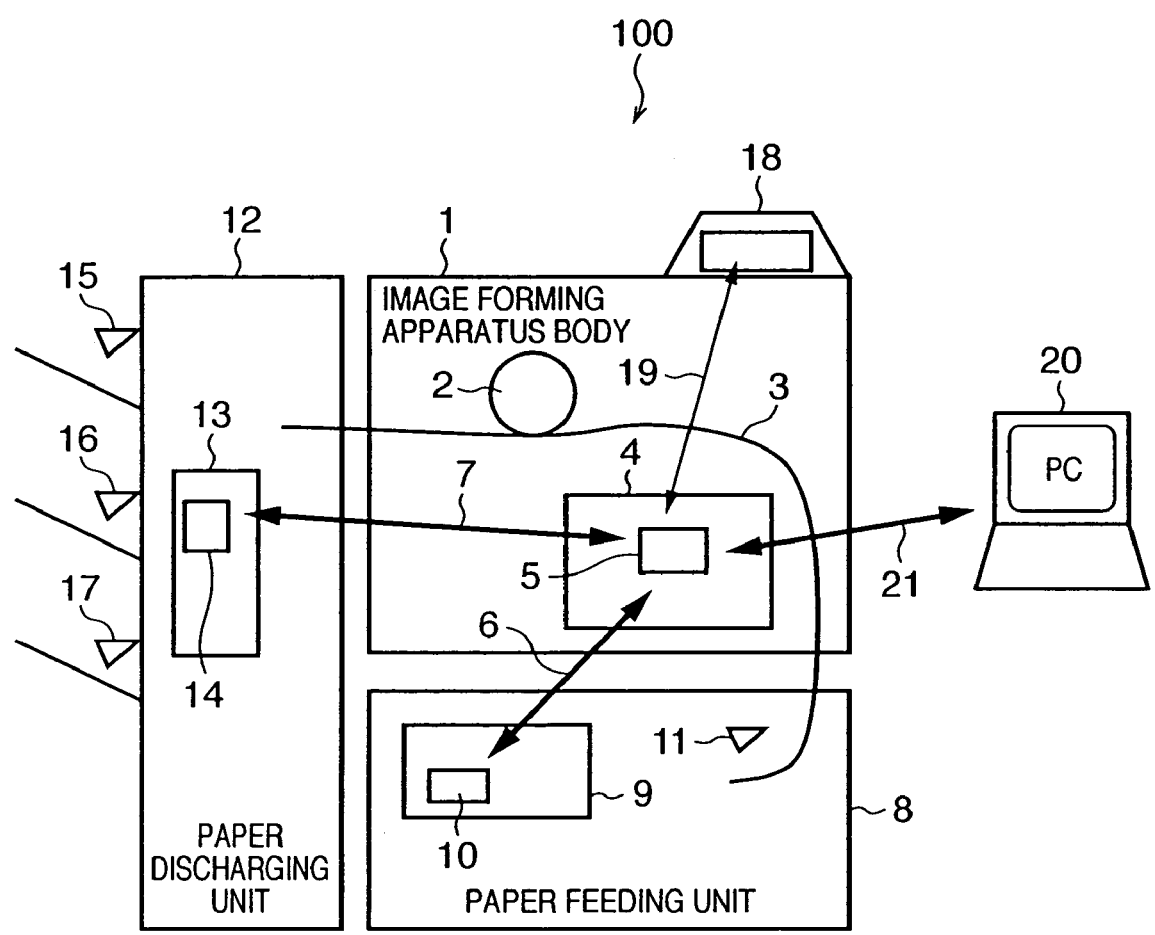
FIG. 1 is a block diagram of an image forming apparatus of a First Embodiment.

Embodiments of the present invention will be now described below with reference to drawings. FIG. 1 is a schematic sectional view showing the configuration of an image forming apparatus according to a First Embodiment. Though the image forming apparatus is assumed to be a printer in this embodiment, the present invention is applicable to a copying machine or a complex machine just the same.

<Configuration of the Image Forming Apparatus and an Image Forming Operation>

An image forming apparatus 100 comprises an image forming apparatus body 1 and two optional apparatuses, that is, a paper feeding unit 8 and a paper discharging unit 12. The image forming apparatus body 1 has an electrophotographic processing section 2, a conveying section 3, an image forming control substrate (body controller) 4 and an operation panel 18. The electrophotographic processing section 2 forms an image on paper with an electrophotographic printing method. The conveying section 3 forms a paper conveying route from the paper feeding unit 8 to the paper discharging unit 12 via the electrophotographic processing section 2. The image forming control substrate (body controller) 4 is mounted with an image forming section CPU 5. By the CPU 5 executing a program included in the CPU 5 itself or in a memory mounted on the substrate 4, control related to the image forming apparatus body 1, such as image forming processing and cooperation with optional apparatuses, is realized. The image forming control substrate (body controller) 4 is provided with a communication section 6 for exchanging data with the paper feeding unit 8 and a communication section 7 for exchanging data with the paper discharging unit 12. The operation panel 18 is connected to the image forming control substrate (body controller) 4 via an operation panel control signal 19, and thereby, it is possible to present display corresponding to the apparatus condition on the operation panel 18 or cause an operator to perform input.

Furthermore, the image forming apparatus body 1 is connected to a computer 20 via a communication line 21. Thereby, it is possible to send data for printing, from the computer 20 to the image forming apparatus 100 and cause the image forming apparatus 100 to print it or to download a program or data for rewriting to the image forming apparatus 100.

The paper feeding unit 8 has a paper sensor 11 and a paper feeding unit control substrate (paper feeding unit controller) 9, on which a paper feeding unit CPU 10 is mounted. The paper feeding unit CPU 10 controls the paper feeding unit 8 under the control of the image forming section CPU 5.

The paper discharging unit 12 has tray full load detection sensors 15, 16 and 17 for detecting that each bin is fully loaded with paper and a paper discharging unit control substrate 13. On the paper discharging unit control substrate 13, there is mounted a paper discharging unit CPU 14 for controlling the paper discharging unit 12 under the control of the image forming section CPU 5.

In the above-described configuration, the image forming apparatus 100 performs an image forming operation in accordance with an instruction from the computer 20. The image forming apparatus 100 calculates the number of sheets of paper required for image formation, and sends paper conveyance information including the number of sheets of paper to the paper feeding unit 8 via the communication section 6 to reserve paper feeding.

In accordance with specification by the computer 20, the image forming apparatus 100 sends paper conveyance information for specifying paper discharging conditions including specification of a bin to which paper is to be discharged, to the paper discharging unit 12 via the communication section 7, to reserve paper discharging.

The paper feeding unit 8 starts paper feeding in accordance with the received paper conveyance information for reserving paper feeding. The fed paper is conveyed to the image forming apparatus body 1 by the conveying section 3. The paper feeding unit 8 determines whether or not there is paper in a paper feeding cassette at the point of time when the fed paper passes by the paper sensor 11.

On the paper conveyed to the image forming apparatus body 1, an image is formed by the electrophotographic processing section 2, and the paper is discharged to the paper discharging unit 12. In accordance with the paper conveyance information received for reserving paper discharging, the paper discharging unit 12 discharges the paper conveyed from the image forming apparatus body 1 to a bin in accordance with specification.

At the timing when one sheet of paper is completely conveyed onto the bin, the paper discharging unit 12 confirms output signals from the tray full load detection sensors 15, 16 and 17 to determine whether or not the bin is fully loaded with paper.

In the case of a "no paper" condition, the paper feeding unit 8 notifies the image forming apparatus body 1 to that effect via the communication section 6. In the case of full load, the paper discharging unit 12 notifies the image forming apparatus body 1 to that effect via the communication section 7.

The image forming apparatus 100 operates and the image forming apparatus body 1 cooperates with the optional paper feeding unit 8 and paper discharging unit 12 as described above. Of course, in addition to reservation of paper feeding and discharging, and notification of no paper and full load, notification of other conditions of the optional units to the image forming apparatus body 1 and sending of an instruction and the like from the image forming apparatus body 1 to the optional units may be performed as required.

<Processing of Rewriting a Control program for an Optional Apparatus>

In an image forming apparatus according to the above configuration, it is possible to rewrite a program or data stored in a memory mounted on each of the control substrates 9 and 13 of the paper feeding unit 8 and the paper discharging unit 12, which are optional apparatuses, or in a memory included in each of the CPU 10 and 14 of the paper feeding unit 8 and the paper discharging unit 12, as described below. In this embodiment, the program is stored in a flash memory included in the CPU.

The CPU 5 knows that an operator will perform a version upgrade work, through the operation panel 18. The above-described rewriting of a program or data is herein referred to as version upgrade. When the version upgrade work is performed, the CPU 5 displays the condition of the version upgrade work on the operation panel 18. The CPU 5 then notifies the operator of whether the version upgrade work has normally ended with the use of the operation panel 18.

If recognizing that any trouble has occurred in the version upgrade work through the operation panel 18, the operator performs the version upgrade work again.

Figure 2:
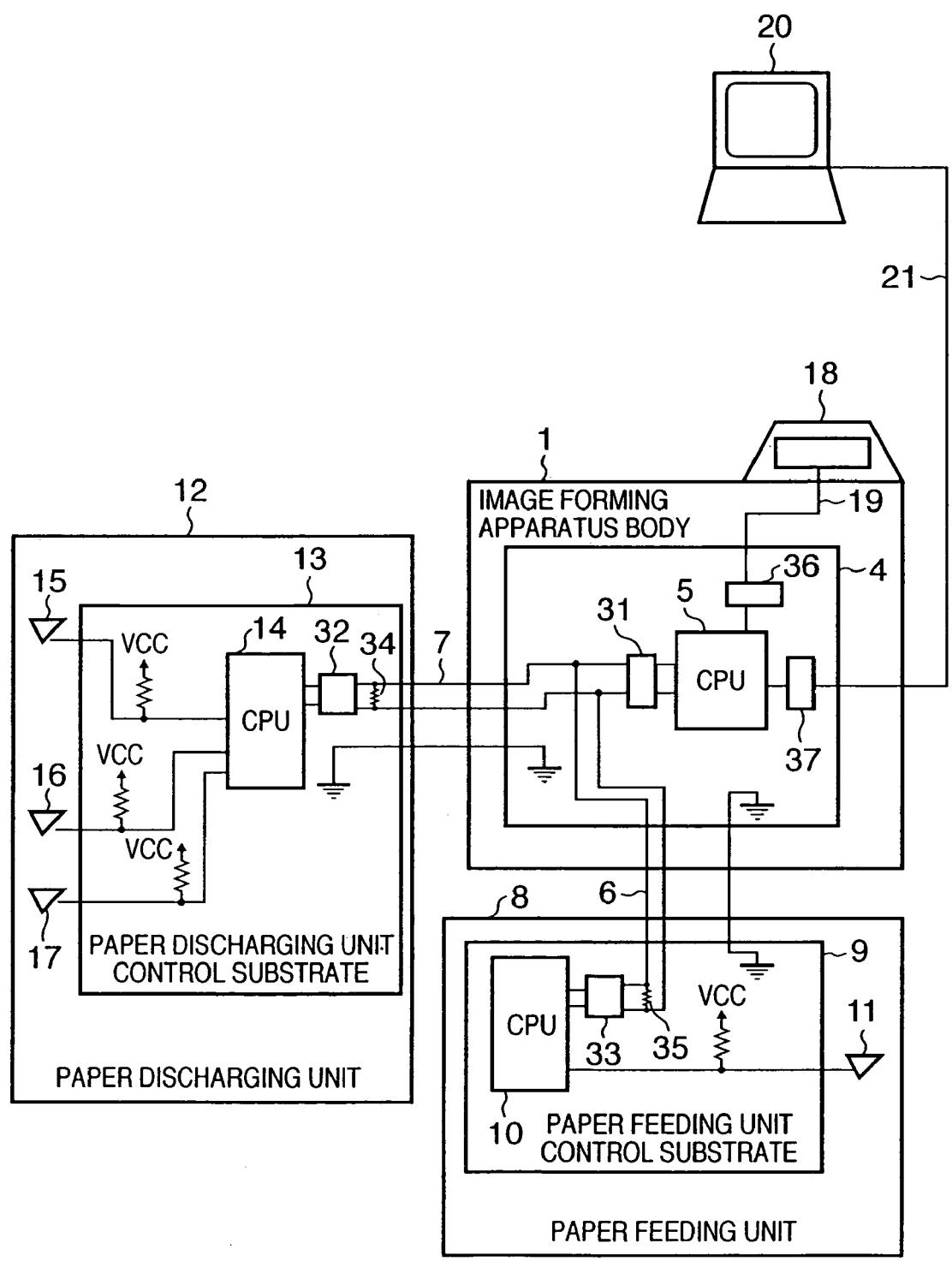
FIG. 2 shows a CPU connection diagram of the image forming apparatus of the First Embodiment.

FIG. 2 illustrates association between each CPU and input/output elements.

A print instruction is communicated from the computer 20 to the CPU 5 via the communication line 21. The CPU 5 controls the electrophotographic processing section 2 to perform an image forming processing. The CPU 5 sends paper conveyance information to the paper feeding unit 8 via the communication section 6 to reserve paper feeding. The CPU 5 sends paper conveyance information to the paper feeding unit 12 via the communication section 7 to reserve paper discharging.

Communication buffers 31, 32 and 33 are interface ICs for enabling multiple CPUs to connect to the same communication line. Terminating resistances 34 and 35 are connected to communication lines forming the communication section 6 and the communication section 7, respectively. A buffer 36 is for the operation panel. A buffer 37 is an interface IC of the communication line 21. Each of the CPU 5, the CPU 14 and the CPU 10 includes a flash memory for storing a program, an RAM for performing a processing and a communication I/F for controlling communication.

The CPU 10 acquires paper conveyance information through the communication section 6. The paper conveyance information includes information on how many sheets of paper are to be fed from the paper feeding unit 8. The CPU 10 controls the feeding operation and inputs a value of the paper sensor 11 indicating whether or not there is paper inside the paper feeding unit 8, from an input port, to determine whether or not a "no paper" condition has occurred.

The CPU 14 acquires paper conveyance information through the communication section 7. The paper conveyance information includes information on how many sheets of paper are to be discharged to the paper discharging unit 12. The CPU 14 controls the paper discharging operation and inputs values of the tray full load detection sensors 15, 16 and 17 from the input port to determine whether a full load condition has occurred.

Figure 3:
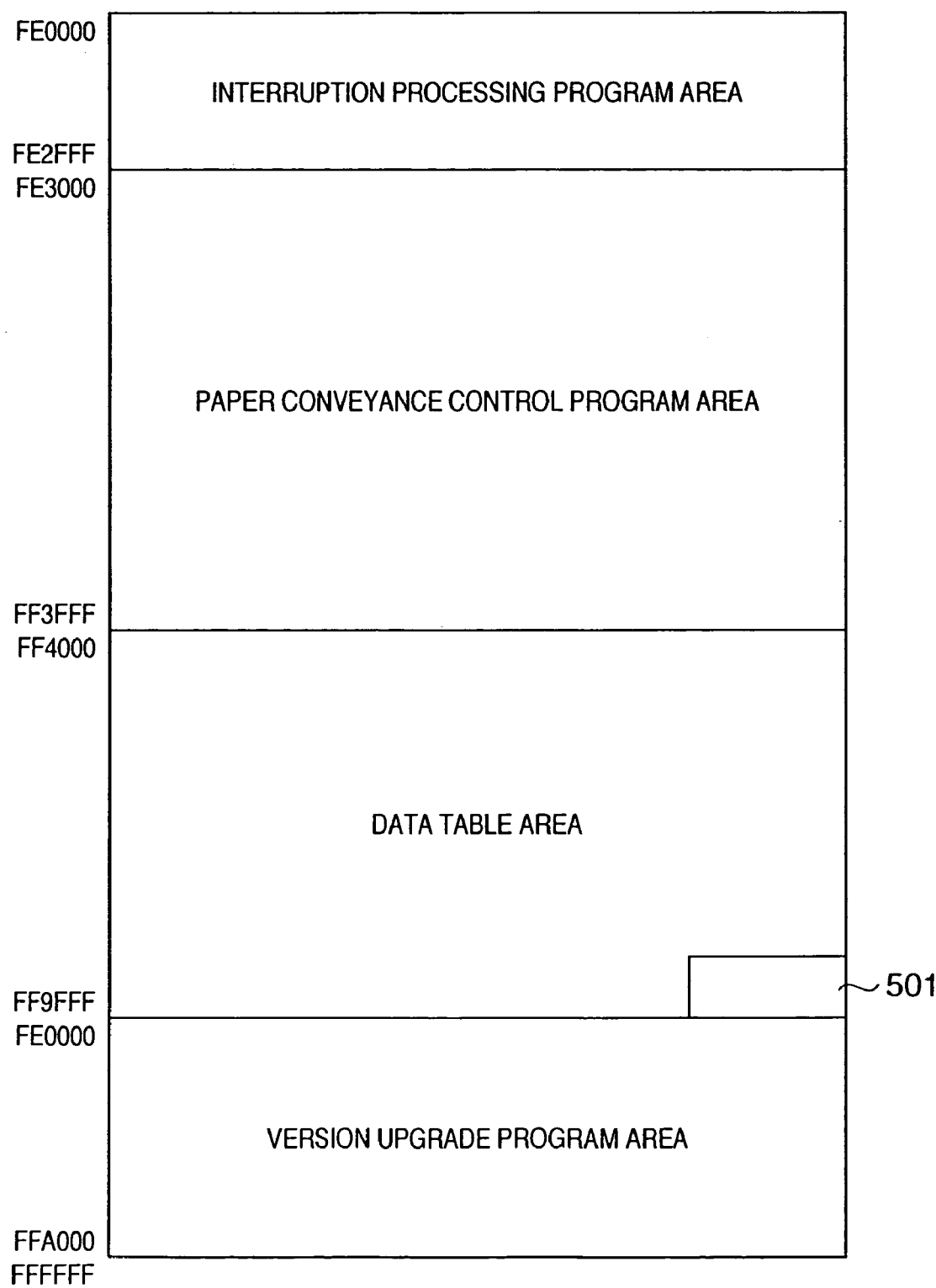
FIG. 3 shows a memory map of a memory included in a CPU 10 of the image forming apparatus in the First Embodiment.

FIG. 3 shows an address map of the flash memory included in the CPU 10. The flash memory included in the CPU 10 is an erasable and rewritable non-volatile memory, for which data can be erased and rewritten with a predetermined size as a unit. At the addresses FE0000 (hexadecimal form and hereinafter the same) to FE2FFF, an interruption processing program for interruption caused by the communication section 6 and the like is stored. At the addresses FE3000 to FE3FFFF, a paper conveyance control program is stored. At the addresses FF4000 to FF9FFF, a data table is stored. At the addresses FFA000 to FFFFFF, a version upgrade program is stored. When version upgrade is performed via communication, rewriting is performed for the addresses FE0000 to FF9FFF. The actual paper feeding operation is performed by the program and data stored at the addresses FE0000 to FF9FFF.

(Procedures in an Image Forming Apparatus Body)

Figure 4:
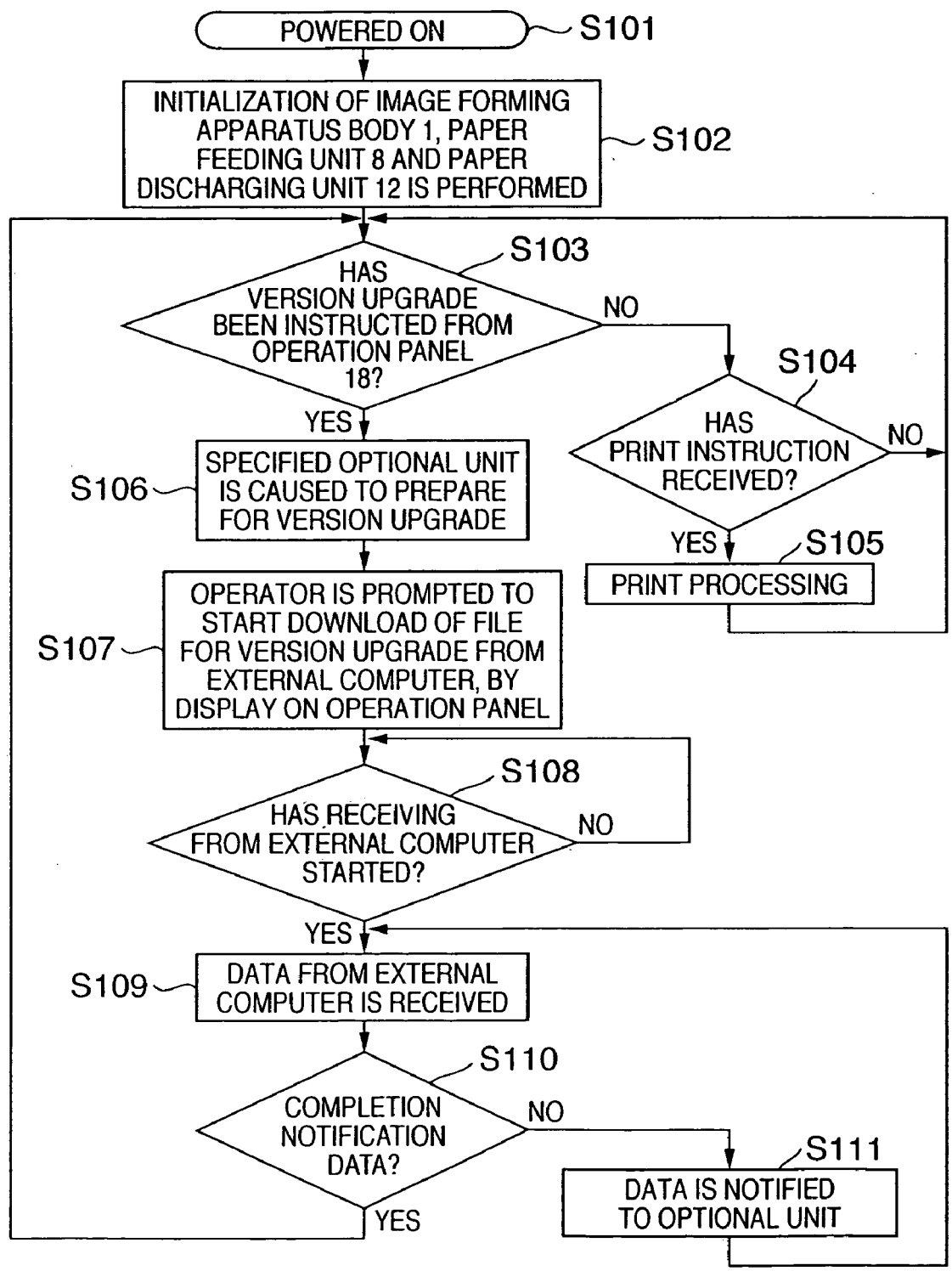
Figure 5:
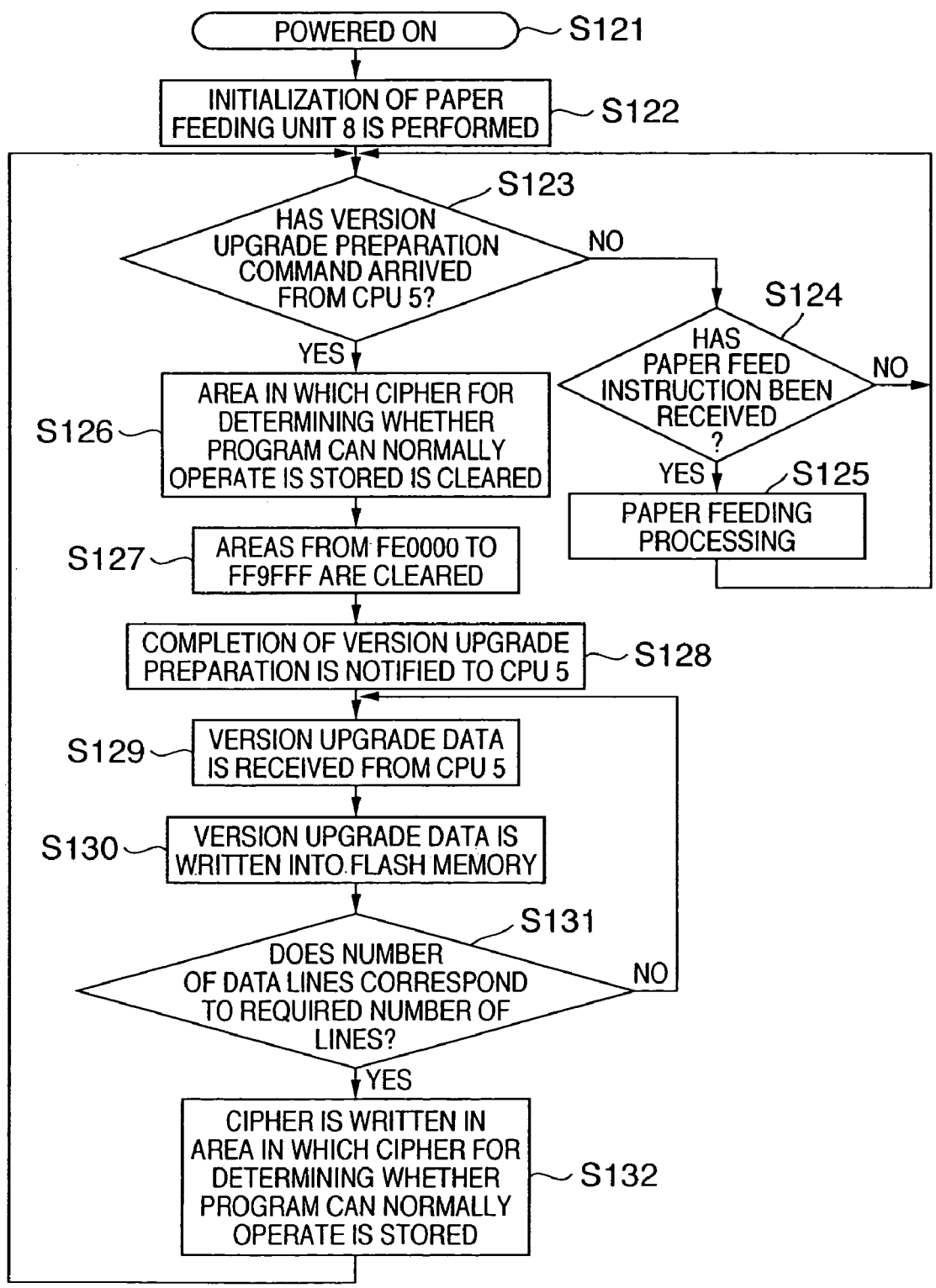
FIG. 5 is a flowchart showing a version upgrade processing performed by the CPU 10 of the image forming apparatus of the First Embodiment.

A program version upgrade processing in an image forming apparatus according to the present invention is carried out in accordance with the procedures shown in the flows in FIG. 4 to FIG. 7. The relationships among the procedures will be described first before describing the contents of each procedure with reference to each figure. FIG. 4 shows a procedure performed by the CPU 5 of the image forming apparatus body 1, and illustrates a processing to be performed in response to a version upgrade instruction by an operator in addition to a print processing. According to this procedure, the current program can be rewritten to a version-upgraded program provided by a manufacturer of the apparatus, for example. FIG. 5 shows the operation of an optional unit which is version-upgraded under the control of the procedure of FIG. 4. In FIG. 5, the processing started at step S121, for example, is stored in a version upgrade program area of FIG. 3 except for the processings at step S124 and S125. The program shown in FIG. 7 as a part of the processing is also stored in the version upgrade program area. However, the steps after step S165 of FIG. 7 may be stored in the paper conveyance control program area. The steps S124 and S125 of FIG. 5 are stored in the paper conveyance control program area.

Figure 6:
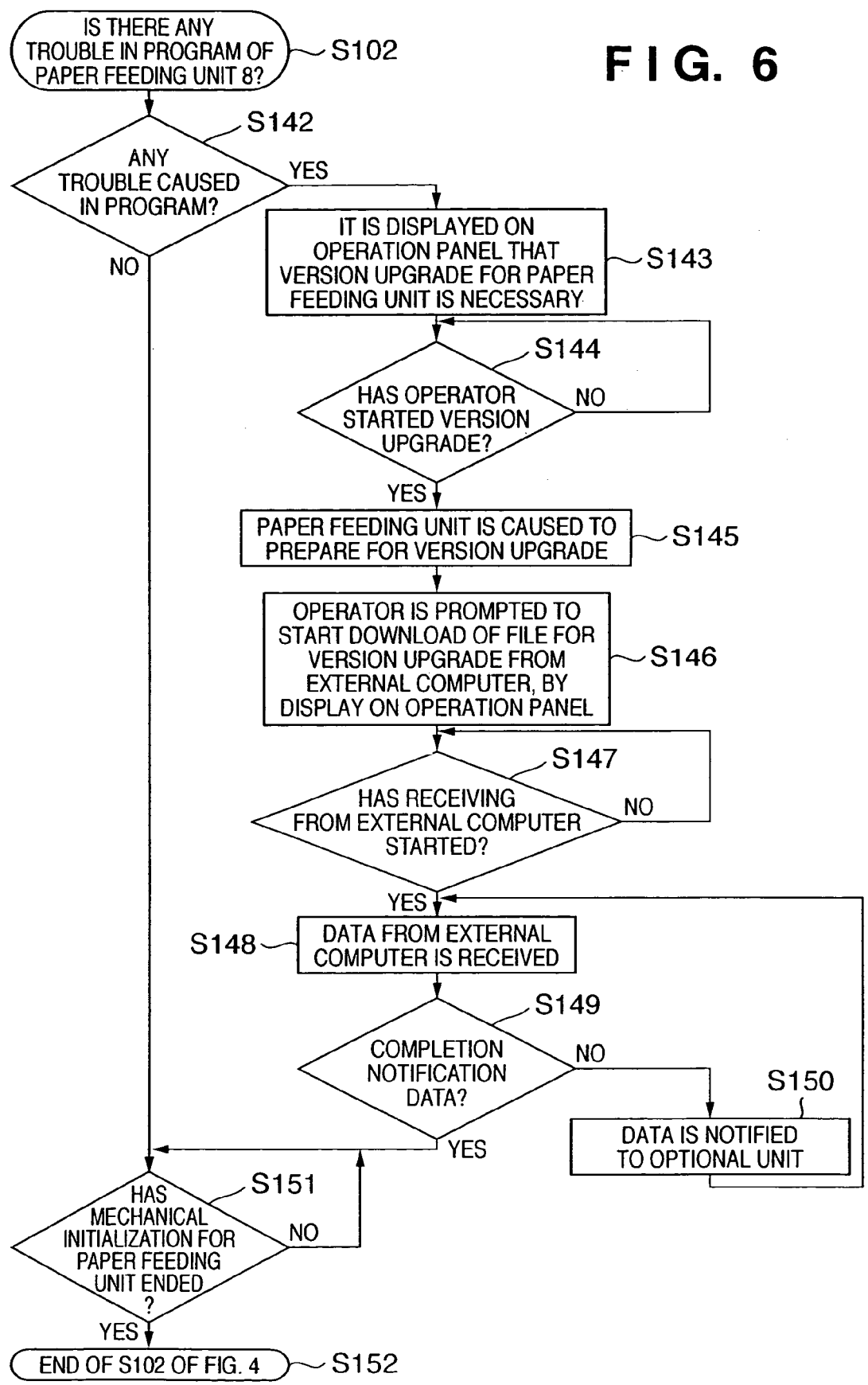
FIG. 6 is a flowchart showing a processing performed by the CPU 5 of the image forming apparatus of the First Embodiment when an error occurs at a paper feeding unit.
Figure 7:
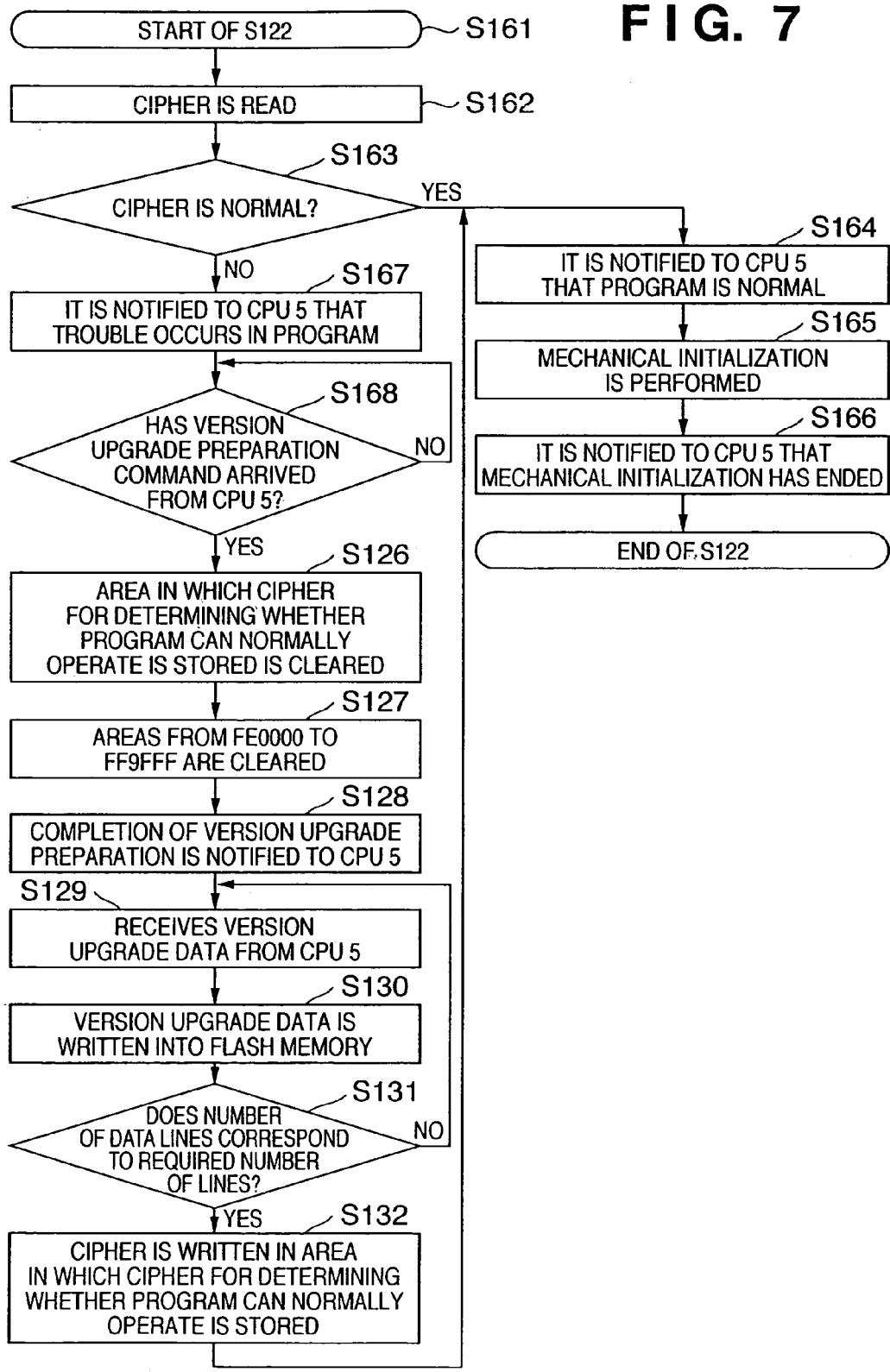
FIG. 7 is a flowchart showing a version re-upgrade processing performed by the CPU 10 of the image forming apparatus of the First Embodiment.

FIG. 7 shows a processing to be performed by an optional unit control CPU when an optional unit starts up. It shows a procedure for performing version upgrade again when version upgrade of a program has not been normally performed. FIG. 6 shows a processing to be performed by the CPU 5 of the image forming apparatus body 1 in response to the processing performed when an optional unit starts up and performs version upgrade again. In particular, as for the program corresponding to the procedure of FIG. 7, the portion corresponding to the version re-upgrade processing is stored in the version upgrade program area and version upgrade is not performed for the portion. Therefore, even when version upgrade of the control program of the optional unit has not been performed normally, the portion can be executed normally.

First, a procedure will be described with reference to FIG. 4. FIG. 4 is a processing flowchart including a version upgrade processing by the CPU 5.

S101: The apparatus is powered on and starts up. The supply power of the image forming apparatus body 1 is also supplied to optional units such as the paper feeding unit 8 and the paper discharging unit 12, and therefore the optional units also start up.

S102: Initialization of the image forming apparatus body 1, the paper feeding unit 8 and the paper discharging unit 12 is performed. When the initialization is completed, the apparatus is in a state capable of image forming ("ready" state). If any trouble (such as version upgrade not having been normally completed) is found in the program of the paper feeding unit 8 or the paper discharging unit 12 and it is notified, version upgrade is re-performed in the sequence of step S102. The details of this portion are shown in FIG. 6.

S103: It is monitored whether the operator has instructed start of version upgrade using the operation panel 18. If start of version upgrade has not been instructed, a usual print operation is performed. The processing at step S102 and the processing at and after step S103 may be separate tasks, and the processing at and after step S103 may be activated when some signal is received from a computer 20.

S104: When a version upgrade instruction has not been received, it is monitored whether a print instruction has arrived from the external computer 20.

S105: A print processing is performed in accordance with a print instruction. When the print processing ends, the procedure returns to step S103 and waits for a version upgrade start instruction or a print instruction.

S106: If it is determined at step S103 that a version upgrade instruction has been received, then a preparation command to perform preparation for version upgrade is issued to an optional unit for which version upgrade has been instructed.

S107: When preparation for version upgrade has been made on the optional unit side, for example, a message prompting the operator to send a version upgrade file is on the operation panel 18 to prompt the operator to send a version upgrade file from the computer 20. The version upgrade file is a file which includes the updated contents of a flash memory.

S108: The procedure waits for start of sending of the version upgrade file from the external computer 20.

S109: The version upgrade file is received as units of data with a predetermined size that form the version upgrade file from the external computer 20.

S110: It is determined whether data received at step S109 is data for notifying completion of sending of the file (completion notification data).

S111: If the received data is not the completion notification data, it is sent to the optional unit for which version upgrade is to be performed. The optional unit performs version upgrade, that is, rewriting of the program or data stored in the flash memory with the data.

(Version Upgrade Procedure in an Optional Paper Feeding Unit)

FIG. 5 is a flowchart showing a procedure of the CPU 10 performing version upgrade. The processing is executed and started by the CPU 10 at the point of time when an optional paper feeding unit is powered on in conjunction with the image forming apparatus body 1 being powered on.

S121: The paper feeding unit is powered on in conjunction with the image forming apparatus body 1 being powered on.

S122: Initialization of the paper feeding unit 8 is performed in accordance with an instruction from the CPU 5. If any trouble is found in the program of the paper feeding unit 8, version upgrade is performed again. The details thereof will be described with reference to FIG. 7. If no trouble is found, only a normal initialization processing is performed.

S123: It is monitored whether a version upgrade preparation command has arrived from the CPU 5.

S124: It is also monitored whether a paper feed instruction has arrived from the CPU 5.

S125: If a paper feed instruction has arrived, a paper feeding processing is performed.

S126: If a version upgrade preparation command has arrived, a cipher is cleared, which is for determining whether a program can normally operate in case that a version upgrade processing should be terminated and any trouble should be caused in the program. The cipher is also stored in the erasable and rewritable non-volatile memory included in the CPU 10. Though a cipher is used here, an error correction code such as a CRC calculated for memory areas including the areas to be rewritten may be stored. At step S126, the error correction code is recalculated for the area to be targeted by the calculation, and it is determined that there is some trouble if any error is found. The cipher is not intended to keep information confidential though it is called a cipher, and therefore, it is not necessarily a cipher. The cipher is stored, for example, in an area 501 at the end of the areas for which version upgrade is to be performed, which are shown in FIG. 3.

S127: The range from FE0000 to FF9FFF, an area for which rewriting is to be performed via communication, is cleared.

S128: The CPU 5 is notified that preparation for version upgrade has been made.

S129: Receiving of actual version upgrade data from the CPU 5 is started.

S130: The received version upgrade data is written into the range from FE0000 to FF9FFF sequentially. The details of the version upgrade processing will be described later with reference to FIG. 9.

S131: It is determined whether the number of lines already received has reached the number of lines required for version upgrade. That is, it is determined whether or not the amount of data to be received has been received at step S131. By setting the interruption processing program area, the paper feeding control program area and the data table area to be collectively rewritten when version upgrade is performed, the determination on whether all the data required for version upgrade has been received or not can be easily performed by calculating the data amount (the number of lines) received at step S131 since the data amount is constant.

S132: If it is determined that received data corresponding to a necessary number of lines has been written, the version upgrade is considered to have been completed. A cipher for determining whether program can normally operate is then written as the final line data of the received data. As described above, an error correction code targeting the area for version upgrade is to be performed may be calculated and written as a the cipher. Instead of a cipher, apparatus code information on the optional apparatus may be written.

(Version Upgrade Procedure to be Performed When a Trouble is Caused in a Paper Feeding Unit)

FIG. 6 is a flowchart showing a procedure of the CPU 5 performing version upgrade again when a trouble is found in the program of the paper feeding unit 8. FIG. 6 illustrates a part of S102 of FIG. 4 in detail. In particular, a part for confirming whether there is any trouble in the program of the paper feeding unit 8 will be described. The action performed for the paper discharging unit 12 can be processed with the same flowchart.

S142: A status indicating that there is any trouble caused in the program or a status indicating that the program is normal is acquired from the paper feeding unit 8. If there is no trouble, the procedure branches to step S151. This status is sent by the paper feeding unit 8 to the image forming apparatus body 1 with the procedure of FIG. 7 to be described later.

S143: If a notification to the effect that there is a trouble caused in the program of the paper feeding unit 8 is received, a message to the effect that version upgrade of the paper feeding unit 8 is required is displayed on the operation panel.

S144: The procedure waits for the operator to instruct version upgrade. If an instruction of version upgrade is inputted, the procedure branches to step S145 for starting version upgrade.

S145: At this point of time, the CPU 5 sends a preparation command to the paper feeding unit 8 so that the paper feeding unit 8 prepares for notification by the CPU 5 of a version upgrade file to the paper feeding unit 8.

S146: It is displayed on the operation panel that the paper feeding unit 8 waits for an instruction to start download of the version upgrade file.

S147: Start of receiving of data from the external computer 20 is monitored. S148: When data receiving is started, the data is received.

S149: It is determined whether data is the final data indicating the end of the version upgrade file.

S150: If data is not the final data (that is, data indicating the end of data), the data is sent to the paper feeding unit 8.

S151: If communication up to the final data ends and receiving of the version upgrade file ends, then the procedure waits for mechanical initialization of the paper feeding unit 8.

FIG. 7 shows a flowchart of a procedure performed by the CPU 10 for checking the control program of the paper feeding unit 8 for any trouble in an initialization processing and performing version upgrade again if any trouble is found. FIG. 7 illustrates a part of S122 of FIG. 5 in detail.

The CPU 10 first reads a cipher to determine whether the program of the paper feeding unit 8 is normal (S162). If the read cipher is correct (in the case where the cipher is an error code; if no error is detected), then it is determined that the program is normal (S163). If the program is normal, the CPU 5 of the image forming apparatus body 1 is notified to that effect (S164). If there is any trouble, the CPU 5 of the image forming apparatus body 1 is notified to that effect (S167). The procedure of FIG. 6 starts at the point of time when such notification is received.

When the program is normal, mechanical initialization is performed (S165). On the contrary, when there is any trouble with the program, the procedure waits for a version upgrade preparation command to arrive from the CPU 5 (S168).

The subsequent sequence of receiving a preparation command and clearing the area for the cipher and the areas to be rewritten (steps S126 to S128), and then receiving version upgrade data and writing it to an erasable and rewritable type non-volatile memory (flash memory) (steps S129 to S132) is the same as the sequence shown in FIG. 5. If the cipher has been written normally (step S133), the procedure returns to S164 and notifies the CPU 5 that the program is normal (S164). After that, mechanical initialization is performed (S165), and the CPU 5 of the image forming apparatus body 1 is notified that the mechanical initialization has ended (S166).

According to the above procedure, even if a version upgrade processing performed for a control program and the like results in a failure, the image forming apparatus of this embodiment can detect the failure when the apparatus starts up next time and retry version upgrade. Thus, it is possible to prevent a failure of version upgrade from causing inoperability of the apparatus for which the version upgrade has been performed.

(Details of the Version Upgrade Processing)

The way to write version upgrade data to an erasable and rewritable type non-volatile memory (flash memory) at S130 of FIG. 5 and FIG. 7 will be now described in detail with reference to FIG. 9.

The CPU 10 writes a predetermined lines of version upgrade data, that is, data of the interruption processing program, the paper conveyance control program and the data table at addresses FE0000 to FF9FFF in FIG. 3, based on a command sent from the CPU 5.

First, a line of data is written to the flash memory and checksum is performed on the line of data (S200). Checksum data for a line of data is sent each time a line of data is sent from the CPU 5. It is checked whether the result of the checksum is "OK", that is, the data corresponds to checksum data sent from the CPU 5 (S201). If the data corresponds to the checksum data, then the number of written data lines is counted up, and the procedure proceeds to S132. If the checksum is incorrect, then a signal to request for resending of the data is outputted to the CPU 5, and the procedure returns to S129.

The number of data lines to be counted here is a unit of data to be received at a time, which is determined depending on the communication method of the communication section 6 which connects the image forming apparatus body 1 and the paper feeding unit 8. For example, if they are connected via 16-bit parallel communication, the data amount for one line can be said to be 16 bits. The value obtained by dividing the data amount to be rewritten by the unit data amount per line is the number of lines to be received. However, the received data amount may be simply counted up.

In short, checksum is performed for each line of the version upgrade data to check if the data has been communicated correctly for each line. After that, the number of lines of the communicated data is furthermore checked as described with regard to S131 of FIG. 5 and FIG. 7 to check more certainly if the data has been communicated correctly.

The reason to check each line of the version upgrade data and even the number of lines of the data will be now described with reference to FIG. 10.

FIG. 10 is a control block diagram related to communication control on an image forming apparatus and a communication apparatus.

The image forming control substrate (body controller) 4 of the image forming apparatus 1 is provided with a PC data processing section 40, an optional unit control section 50 and an optional communication control section 60. The PC data processing section 40 has a function of receiving version upgrade data downloaded from a PC and sending it to the optional unit control section for controlling the paper feeding unit and the paper discharging unit. The optional unit control section 50 has a function of receiving the version upgrade data from the PC data processing section and controlling which optional apparatus the data should be sent to. The optional communication control section 60 has a function of controlling data communication to an optional apparatus (the paper feeding unit or the paper discharging unit) determined by the optional unit control section 50.

In short, the version upgrade data downloaded from a PC is sent to an optional unit via multiple processing control sections, that is, the PC data processing section 40, the optional unit control section 50 and the optional communication control section 60, while being accumulated in a memory M. Since the data in the memory M is communicated via the multiple processing control sections, the probability that abnormality or lack of the data is caused when the data is sent to and from the memory M is high at each step of the processing.

More specifically, the speed of the data receiving and sending processing by the PC data processing section 40 is higher than the processing speed of the optional communication control section 60, and therefore, the data to be sent to the optional communication control section is accumulated in the memory M with a predetermined capacity in the controller 4 and waits for being sent. It is not possible to accumulate more than a predetermined amount of data in the memory M. Therefore, if a predetermined amount of data has been accumulated in the memory M, the PC data processing section 40 once stops receiving of data from the PC. As the data processing progresses in the optional communication control section 60, the PC data processing section 40 resumes receiving data from the PC and resumes sending data from the memory M to the optional communication control section 60. As data receiving is repeatedly stopped and resumed, lack of data received by the memory M or sent from the memory M is apt to be caused when receiving is stopped or resumed. When the amount of data sent from the PC is large, stoppage and resumption of data communication is more frequently repeated because the processing in the optional communication control section 60 is slower, and a trouble such as lack of data may be caused during sending to and receiving from the memory M.

Therefore, in a commonly employed method of detecting an error in transmit data by checking the top address or data of version upgrade data and the final address or data thereof, the transmit data is determined to be correct even when lack is caused in an intermediate data line. As a result, in spite of the lack, version upgrade is performed to control an optional apparatus, and a trouble is caused in operation.

In comparison with this, by performing checksum for each line of version upgrade data and then further checking the number of lines of communicated data as described above, it is possible to surely detect an error in data even when lack of the data has been caused during communication.

Figure 9:
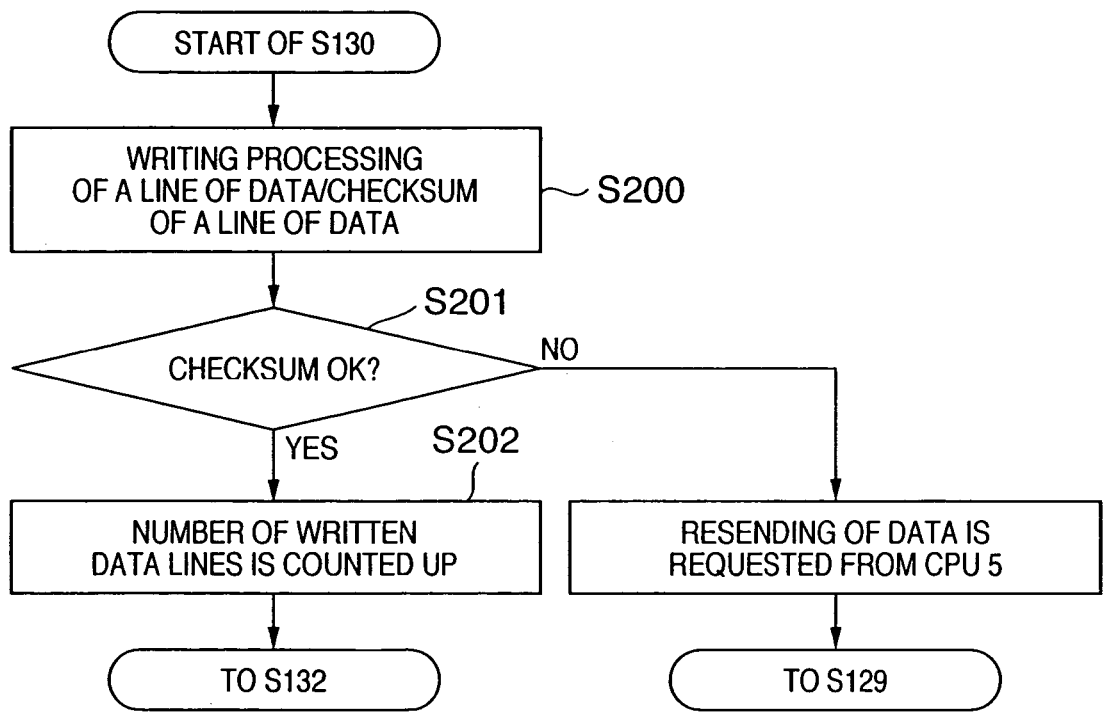
FIG. 9 is a flowchart showing a version upgrade processing performed by the CPU 10 of the First Embodiment.

The buffers 31 and 37, the paper feeding unit 8, the paper feeding unit control substrate 9, the paper discharging unit 12 and the paper discharging unit control substrate 13 in FIG. 9 have been described with regard to FIG. 2, and therefore, description thereof is omitted.

Though description has been made on an optional apparatus of an image forming apparatus as an example in the First Embodiment, the same control can be applicable to an image forming apparatus body. Furthermore, rewriting of a program and the like in a flash memory can be also performed for the paper discharging unit 12.

Though, at S131 of FIG. 5 and FIG. 7, data is received from the CPU 5 again if the number of received lines has not reached the number of lines required for version upgrade as a result of determining whether the number of received lines has reached the number of lines required for version upgrade, a signal for displaying indication of an error or indication prompting data resending to be requested on the computer 20 or the operation panel of the image forming apparatus may be outputted to the CPU 5.

Though, at S201 of FIG. 9, a signal of requesting resending of data is outputted to the CPU 5 if the result of checksum is an error, a signal for displaying indication of an error or indication prompting data resending to be requested on the computer 20 or the operation panel of the image forming apparatus may be outputted to the CPU 5.

Second Embodiment

Associations between each CPU and input/output elements in a Second Embodiment is the same as in the First Embodiment. The difference from the First Embodiment is that address checking is performed. In the First Embodiment, checksum is performed for each line. In this embodiment, address checking is further performed for each line.

Figure 8:
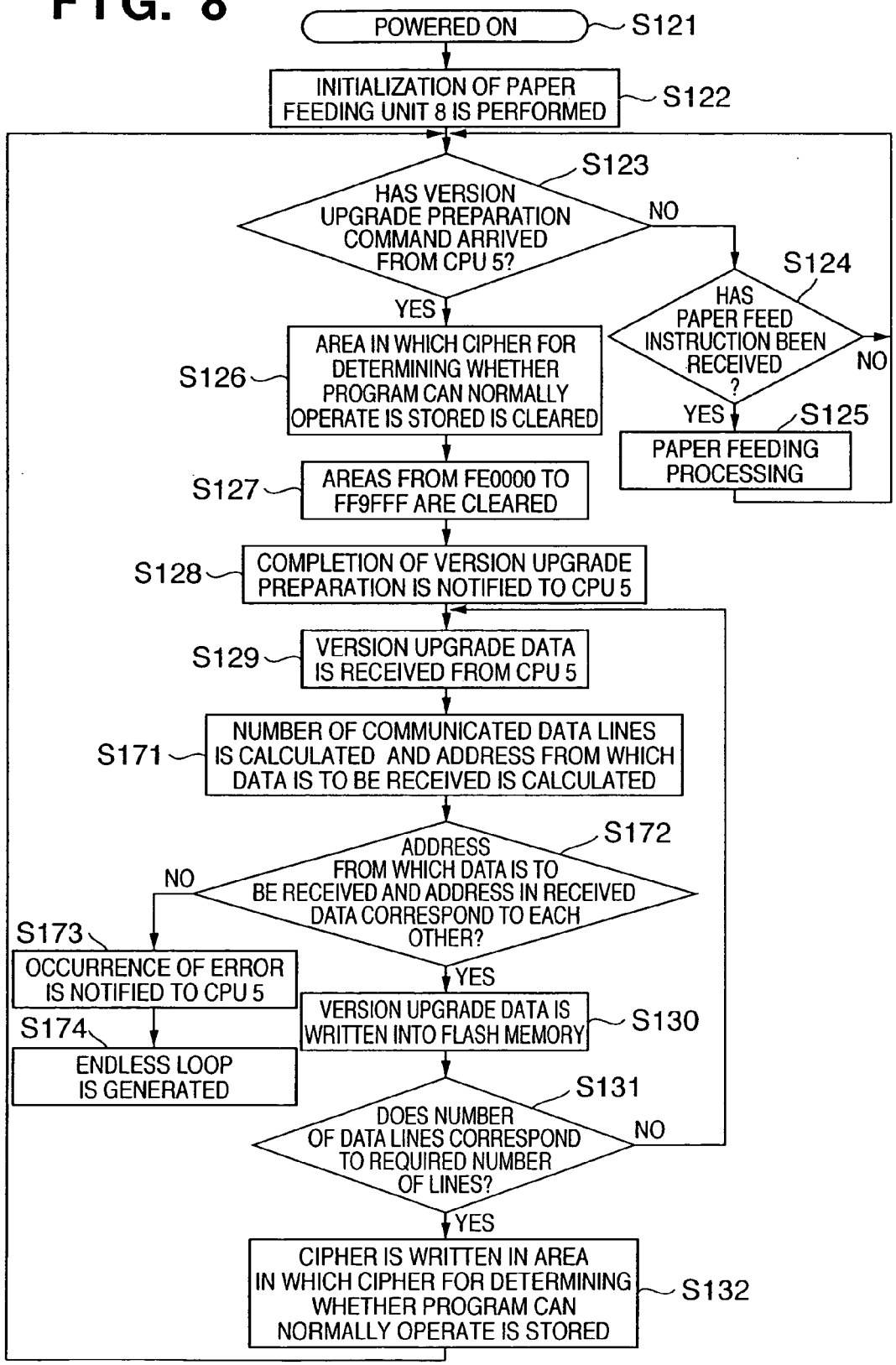
FIG. 8 is a flowchart showing an error detection processing performed by the CPU 5 of an image forming apparatus of a Second Embodiment.

A communication error checking method will be now described with reference to FIG. 8. The steps except for steps S124 and S125 of the program of FIG. 8 are also stored in the version upgrade program area in FIG. 3 the same as in FIG. 5. Description of the same steps as those in FIG. 5 is omitted.

S129: Version upgrade data is received from the CPU 5.

S171: The number of communicated data lines is calculated. The address from which data is to be received is calculated from the number of lines. For example, in the case where data is sequentially received from the top of the areas to be rewritten in FIG. 3, the top address is known in advance, and therefore, the address from which data is to be received next can be calculated by adding the received data amount corresponding to one line to the value of the top address.

S172: The address from which data is to be received is compared with the address from which data has been actually received. Since the received data includes the address of the data, the address calculated at step S171 can be compared with the received address.

S130: If the two addresses correspond to each other as a result of the comparison, then the data is written to the flash memory. The writing sequence is similar to that described with regard to the First Embodiment, and therefore, description thereof is omitted (see FIG. 9).

S173: If the two addresses do not correspond to each other as a result of the comparison, then occurrence of an error is notified to the CPU 5.

S174: In the case of an error, an endless loop is generated and all the subsequent operations are stopped.

According to the above procedure, it is possible to perform address checking for each data line and determine an error in received data for version upgrade to perform a more secure version upgrade operation. If the same change as made in FIG. 8 is also made in FIG. 7, that is, steps S171 to S174 are inserted between steps S129 and S130 in the version re-upgrade processing in the initialization processing of the paper feeding unit 8, the same as FIG. 8, then address checking can be also performed to perform a more safe version re-upgrade.

Though address checking is performed for each line in this embodiment, the number of lines can be changed as appropriate based on the error rate relative to the data amount to be sent and the like.

Though occurrence of an error is notified to the CPU 5 when the addresses do not correspond to each other at S173, a signal of requesting resending of data may be outputted to the CPU 5.

Third Embodiment

Associations between each CPU and input-output elements in a Third Embodiment are the same as those in the First Embodiment. The difference of the Third Embodiment from the First Embodiment is that a file to be downloaded is divided into multiple portions.

In this embodiment, a version upgrade file stored in an external apparatus 20 is divided in a first file for the interruption processing portion, a second file for the paper conveyance control and a third file for a the data table, which are shown in FIG. 3. Version upgrade does not complete until these three files are downloaded. In this case, it is easily determined whether the three files have been downloaded by checking the number of communicated lines, and thereby mistakes made by an operator in the version upgrade can be prevented.

An image forming apparatus has been described in preferred embodiments of the present invention. However, the present invention is applicable not only to an image forming apparatus but also to any apparatus for which a program or data stored in an erasable and rewritable memory (what is called broadly defined firmware) can be rewritten.

Since the version upgrade program is not to be rewritten, it may be recorded on an unrewritable ROM.

Though the contents of a flash memory is rewritten with data received from an external apparatus in the embodiments described above, the present invention is applicable to the case where an image forming apparatus is provided with a storage and data in a flash memory is rewritten with data read from the storage.

The present invention is not limited to the embodiments described above but includes variations based on the same technical ideas.

CLAIM OF PRIORITY

This application claims priorities from Japanese Patent Application No. 2003-307181 filed on Aug. 29, 2003 and Japanese Patent Application No. 2004-232500 filed on Aug. 9, 2004, which are hereby incorporated by reference herein.

What is claimed is:
1. An image forming apparatus comprising:
(a) a memory for rewritably storing data for controlling an operation of the image forming apparatus;
(b) a receiver for receiving a version upgrade data; and

(c) a processor for performing a version upgrade process to rewrite the data in the memory with the version upgrade data in response to a version upgrade instruction signal received by the processor, wherein the upgrade process includes:
  (i) a plurality of writing operations for writing a unit of a predetermined amount of the version upgrade data received by the receiver,
  (ii) a plurality of first checking operations for checking whether an error exists in the unit of the predetermined amount of the version upgrade data every time the unit of the predetermined amount of the version upgrade data is written, and
  (iii) a second checking operation for, after the writing operations for writing the entire version upgrade data have been finished, checking information regarding a number of the writing operations so as to determine whether or not the entire version upgrade data has been written successfully, and wherein the processor determines that the entire version upgrade data has been written successfully when no error is detected by the first checking operations and the entire version upgrade data is determined to have been written successfully by the second checking operation.

2. The image forming apparatus according to claim 1, wherein the processor further performs address checking of each predetermined unit of the version upgrade data.

3. The image forming apparatus according to claim 1, wherein a program for performing the version upgrade process is stored in the memory.

4. The image forming apparatus according to claim 1, wherein the processor writes predetermined data indicating that the rewritten version upgrade data is normal at the end of the rewritten version upgrade data.

5. The image forming apparatus according to claim 1, wherein the predetermined amount of the version upgrade data is a data amount corresponding to one line in the memory, and wherein the information regarding the number of writing operations is a number of lines written in the memory.

6. The image forming apparatus according to claim 1, wherein the data is a program or data for controlling the electronic apparatus.

7. The image forming apparatus according to claim 1, wherein the version upgrade instruction signal and the version upgrade data for rewriting are sent from an external apparatus.

8. The image forming apparatus according to claim 1, further comprising a paper discharging apparatus connected to an image forming apparatus for performing image forming based on printing data; wherein the data rewritably stored in the memory is program data for controlling the paper discharging apparatus.

9. The image forming apparatus according to claim 1, further comprising a paper feeding apparatus connected to the image forming apparatus, wherein the data rewritably stored in the memory is program data for controlling the paper feeding apparatus.

10. The image forming apparatus according to claim 1, wherein the processor outputs a signal of requesting resending of the version upgrade data for rewriting to an external apparatus if the result of the first checking operation is an error.

11. The image forming apparatus according to claim 1, wherein the processor outputs a signal of requesting resending of the version upgrade data for rewriting to an external apparatus if the entire version upgrade data is determined not to have been written successfully by the second checking operation.

12. The image forming apparatus according to claim 1, wherein the processor outputs a signal indicating occurrence of an error to stop the rewriting operation if the result of the first checking operation is an error.

13. The image forming apparatus according to claim 1, wherein the processor outputs a signal indicating occurrence of an error, to stop the rewriting operation, if the entire version upgrade data is determined not to have been written successfully by the second checking operation.

* * * * *